Feb. 9, 1965          B. W. WILLIAMS          3,168,840
STOP-START REVERSE MECHANISM
Filed Dec. 4, 1961                3 Sheets-Sheet 1
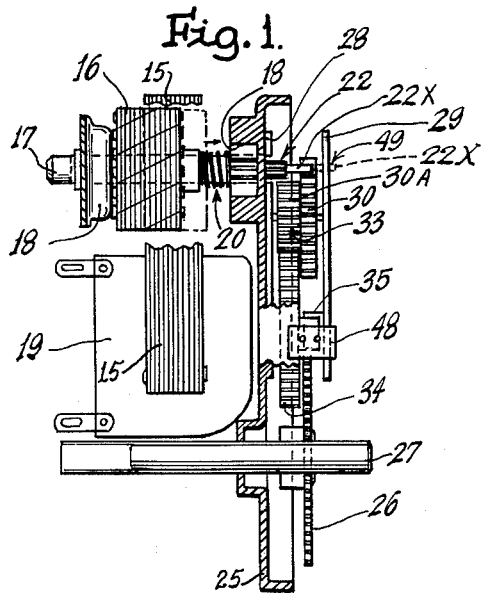
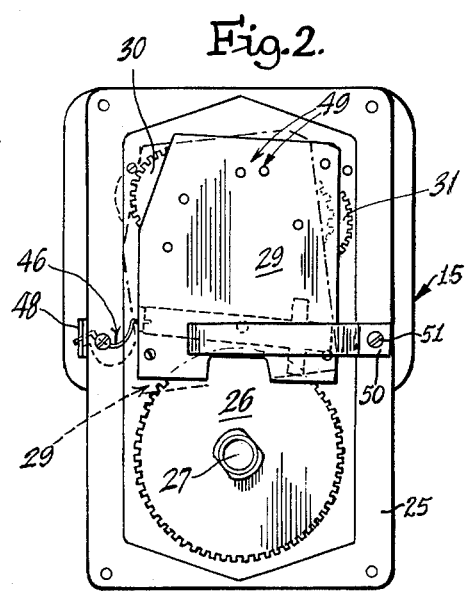
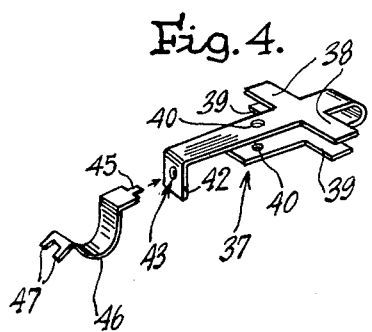
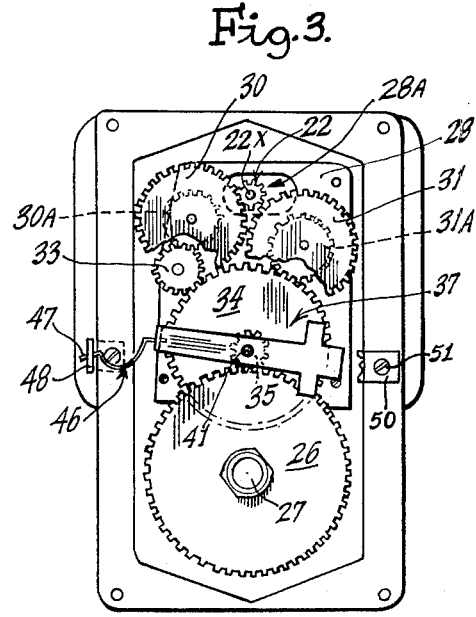
INVENTOR.
BRADLEE W. WILLIAMS
BY
ATTORNEY.

Feb. 9, 1965   B. W. WILLIAMS   3,168,840
STOP-START REVERSE MECHANISM
Filed Dec. 4, 1961   3 Sheets-Sheet 2
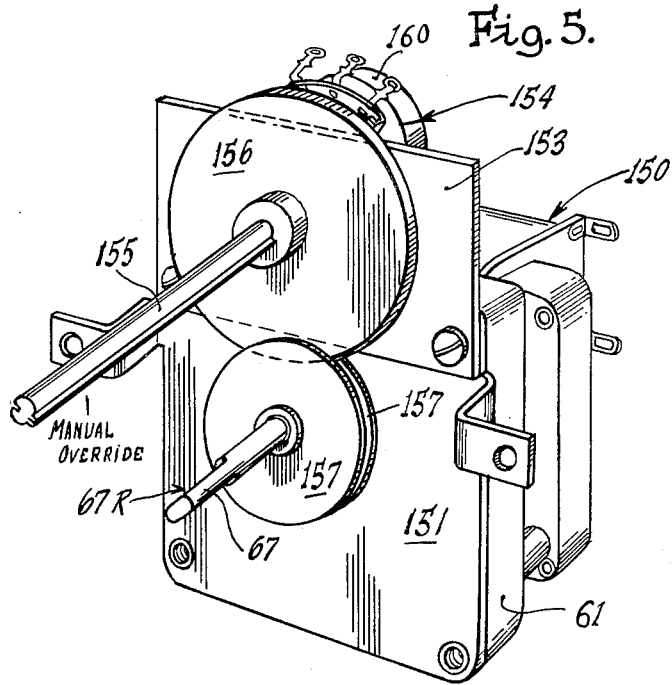
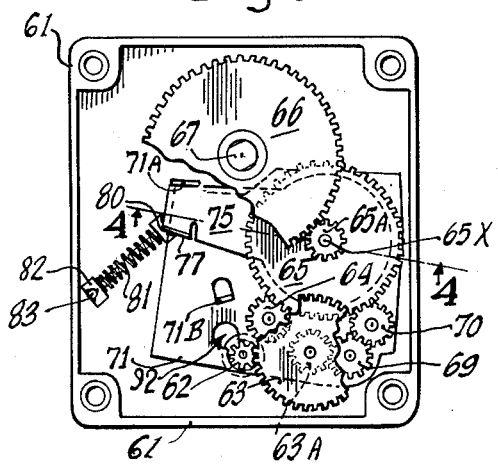
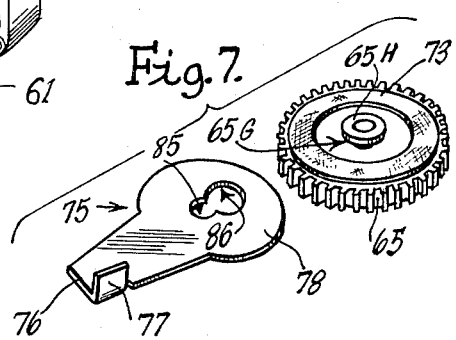
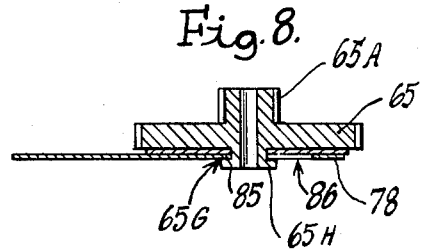
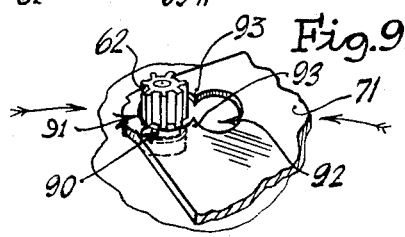
INVENTOR.
BRADLEE W. WILLIAMS
BY
ATTORNEY.

INVENTOR.
BRADLEE W. WILLIAMS
BY
ATTORNEY.

ns of this type in combination with an electric motor and so contrived that with each starting of such motor the reverse mechanism will be conditioned so that on the next stoppage thereof the reversing mechanism will be automatically actuated.

United States Patent Office 3,168,840
Patented Feb. 9, 1965

3,168,840
STOP-START REVERSE MECHANISM
Bradlee W. Williams, Biltmore, Barrington, Ill., assignor to Comar Electric Company, Chicago, Ill., a corporation of Illinois
Filed Dec. 4, 1961, Ser. No. 156,849
14 Claims. (Cl. 74—472)

This invention pertains to reverse drive mechanisms for use with electric motors, and has as its object the provision of a compact, mechanically-actuated, automatically-reversing mechanism of this type in combination with an electric motor and so contrived that with each starting of such motor the reverse mechanism will be conditioned so that on the next stoppage thereof the reversing mechanism will be automatically actuated.

A more detailed object is the provision of an electric motor and particularly, but not necessarily, a fractional horsepower induction motor of the squirrel-cage variety, in combination with a reverse-drive mechanism operable on starting of the motor to cock a snap-acting throw-over means which becomes effective on stopping of the motor to reverse the direction of output drive when the motor is next again started.

Viewed from another aspect, a further object is the provision of a reverse-drive mechanism in combination with an electric motor having an axially-shiftable rotor movable back and forth on starting and stopping of the motor to condition the reverse mechanism on starting for a reversing operation, which will become effective on the next immediate stoppage of the motor, and means for triggering the reversingly operation depending on the next axial shift of the rotor.

Still another object is the provision in a gear system of a set of reversing gears interposed between a driving shaft and a driven shaft and movable into relatively reverse driving relationships in the gear system, and means for shifting the reverse gears automatically in response to each starting and stopping operation of a motor means cooperable with the gear system.

Still further objects relate to details of the construction and operation of the several embodiments of the invention as described hereinafter in view of the annexed drawings in which:

FIG. 1 is a fragmentary vertical section through a first embodiment of a complete motor and gear system with parts shown in elevation;

FIG. 2 is a front elevational view of the gear box of FIG. 1 with the cover plate removed;

FIG. 3 is a view similar to FIG. 2 but having the outer frame plate of the reverse drive gear unit removed to expose one form of gear system;

FIG. 4 is a perspective detail of one form of the snap-action friction coupling clutch;

FIG. 5 is a perspective view of a modified form of the motor unit including an electric circuit device actuated thereby;

FIG. 6 is an elevational view of the gear box of the unit of FIG. 5 with the cover plate removed, and showing a second modified form of gear system;

FIG. 7 is a perspective detail to enlarged scale of a modified friction coupling means used in the embodiment of FIG. 6;

FIG. 8 is a sectional detail through the parts of FIG. 7 in their assembled relation;

FIG. 9 is a fragmentary perspective detail of the motor pinion and rotor shaft locking means employed in the gear system of FIG. 6;

Figure 10:
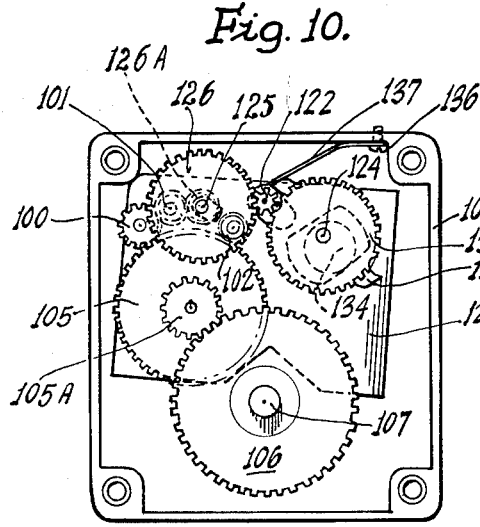
FIG. 10 is an elevational view of the gear box with cover plate removed, for a third modified gear system and throw-over means with parts shown in the cocked position ready for reversal.

In one embodiment, such as depicted in FIG. 1, the electric motor is of the inductive-clutching type consisting of the usual laminated field frame 15 and a squirrel-cage type rotor 16 having a long shaft 17 which is shiftable lengthwise in bearings 18 and carries a spring 20 normally acting to thrust the rotor 16 (toward the left, full lines) partially out of the magnetic field of the stator frame set up by winding thereof (as in FIG. 1) so as to disengage the drive pinion 22 on shaft 17 from the driven gears, as will more fully appear.

When the motor winding 19 is energized, the rotor 16 is pulled fully into the field (dotted lines), FIG. 1, and will thrust the pinion 22 into driving engagement with one of the driven gears 30 or 31. In this sense, the shiftable rotor 16 affords an inductive clutching or coupling means of known function in the art, which is frequently used in small motors in conjunction with a reduction gear system enclosed in a molded housing 25 sometimes forming part of the motor, said system including a main output gear 26 on countershaft 27 (FIGS. 1 and 3) and other gears ultimately driven from the motor pinion 22.

In accordance with the present disclosures, an automatic start-stop reversing gear system is interposed between the motor pinion 22 and the main output gear 26, said system comprising (FIG. 3) first and second reverse drive gears 30, 31 journalled on pins on a rockable carrier comprising conjoined spaced plates 28 and 29 (FIGS. 1, 2, 3) in juxtaposition with the motor pinion 22, such that by oppositely rocking this carrier about an axis through the pinion 35, at 41 (FIG. 3), one or the other of the two reverse drive gears 30, 31 will engage the motor pinion 22 provided the latter is thrust (e.g. by rotor displacement to the right) into a certain driving position.

Reverse gear 30 drives the output gear through an integral pinion 30A (FIG. 3), an idler gear 33, and an intermediate gear 34 which in turn drives the main output gear through an attached pinion member 35.

Similarly, the reversely-driving gear 31 drives the main output gear and shaft 26–27 through its integral pinion 31A and said intermediate gear and pinion means 34, 35.

Means for automatically locking the reverse gear carrier into cocked or "set" condition comprises a friction coupling or clutch device 37 (FIGS. 3 and 4) in the form of a piece of flat spring stock of dual cruciform configuration, bent back upon itself so that upper and lower spaced pairs of cross arms 38 and 39 are aligned in overlying confronting juxtaposition and resiliently spaced to fit fractionally against opposite sides of the intermediate gear 34, the opposite legs of this formed clutch piece being pierced as at 40 to fit onto an endwise stud spindle 41 which journals the intermediate gear and pinion set 34–35 in the pair of carrier plates (FIG. 3).

One leg of the cruciform spring clutch piece 37 is made longer than the other and has its end 42 turned over and pierced as at 43 to receive a tab 45 located at one end of a snap-action bow spring 46, which spring has at its opposite end a pair of tabs 47 seated in apertures formed in a lug 48, secured on the housing (FIGS. 1, 2, 3).

The action of the spring blade clutch piece is such that when the gear 34 starts to turn one way or the other the friction grab of the clutch arms 38, 39 will tend to carry the clutch rocker piece around with it, and thus tend to move the snap-spring into, and beyond, its over-center position; but, since the motor drive pinion 22 is in blocking (and driving) position, the snap-spring cannot go over center, but as soon as pinion 22 is withdrawn, the entire carrier and reverse gear system will instantly rock about the axis of stud spindle 41, past center, with a snap-action to reverse the gear drive, the range of rocking displacement being quite small, as indicated in FIG. 2 by the dotted and full-line positions of the plate 29, but calculated to throw one or the other of the reverse-drive gears 30, 31 into or out of driving engagement with motor pinion 22.

In the operation of the embodiment of FIGS. 1 through 4, energization of the motor winding thus first causes the rotor 16 to shift to the right (FIG. 1), causing motor pinion 22 to engage whichever of the two reverse gears 30, 31 happens to be in driving position, the bottom carrier plate 28 (FIG. 3) having an enlarged passage 28A cut therein to permit free passage of the pinion 22 and its shaft for this purpose.

When the intermediate gear 34 starts to turn, the snap-action clutch or coupling member 37 begins to rock the snap-spring 46 toward over-center condition, but this tensioning of the snap-spring produces no rocking of the reverse gear unit or carrier means 28, 29 at this time, because the direction of the acting spring thrust is such as to urge and hold the reverse gear 30 (or 31) firmly against the motor pinion 22. However, the next withdrawal of this pinion 22 to occur, as by deenergizing the motor winding 19, will cause the motor pinion to be retracted by action of the rotor spring 20, thus removing the obstacle to over-center snap action of the snap-spring 46, which will instantly complete its over-center action in rocking the carrier to an opposite position.

It will be apparent that when the motor is next started the direction of drive of the main output shaft 27 will be the reverse of its direction in the immediately preceding motor operation, this reversal action being effected automatically every time the motor is started and stopped or its rotor and pinion means 16–22 is momentarily pulsed to withdraw.

The throw of the rotor 16 and shaft 17 is normally sufficient so that small axial displacements due to line voltage or load variations are not sufficient to trigger the reversing operation.

The reverse gear unit may be inserted in, and removed from, the housing at will, along with the main gear and shaft 26, 27, there being a spring blade presser arm 50 (FIG. 2) pivotally mounted at 51 on the housing and adapted to turn into and out of the overlying position of FIG. 2 to press the carrier down into its operative position.

In order to further ensure against accidental reversing action due to fluctuations or hunting effects in the rotor position, such as can result when marginal motor operating voltages are encountered, or fluctuations in line voltage occur, as previously alluded to, the motor pinion shaft is provided with a pin extension 22X (FIG. 1) long enough to enter (as in dotted lines) one of two over-size guide holes 49 in the outer carrier plate 29 (FIG. 2), by reason of which the carrier is prevented from snapping-over until the rotor, and hence the pin extension 22X, is first withdrawn, to the left, a predetermined maximum holding distance.

The embodiment shown in FIGS. 5 to 9 also illustrates one important commercial application of the invention which can employ any of the three forms disclosed, namely, in a remote-control switch and volume control for radio, television, and like adaptations, as will more fully appear.

In the construction of FIG. 5 the motor 150 will be of the same shiftable clutch-rotor type described in view of FIG. 1, and will have an attached housing or gear box 61 including a similar set of reduction gears to be driven by a motor pinion 62 (FIG. 6) which shifts into and out of driving relation to a driven gear 63 responsive to starting and stopping of the motor, as in the first embodiment.

Pinion 63A of the driven gear in forward drive will engage an idler pinion 64 to drive directly a large intermediate reduction gear 65 having an integral pinion 65A, which in turn drives the main output gear 66 on the output countershaft 67.

In reverse drive, the pinion 63A of the driven gear 63 will mesh with idler pinion 69 driving another idler 70 which in turn drives the reduction gear 65.

The gears and pinion 64, 65, 69, and 70 are carried on suitable studs or pins staked or otherwise secured on a single carrier plate 71 floating rockably about the axis of pivot pin 65X of the gear 65, so that in one position of the carrier the driven-gear pinion 63A will mesh with, and drive, the first idler pinion 64, and in the reversely-rocked position of the carrier the pinion 63A will mesh with, and drive the reversing idler pinion 69, it being noted, however, that the relative ratios of the pinions 63A, 69, and 70 to the gear 65 are the same as that of pinions 64 to gear 65, and therefore only the direction of rotation of the large intermediate gear 65 will be changed when the gear carrier 71 is rocked between its alternate positions, as in the case of the embodiment of FIGS. 2 and 3.

The means employed for achieving a positive throw-over of the carrier in the embodiment of FIG. 6 comprises a modified friction coupling such as shown in FIGS. 7 and 8 and comprising a friction member in the form of a ring 73 of friction material such as felt, secured as by an adhesive on the underside of the intermediate gear 65, and a metal arm 75, having a radial finger 76 projecting from a hub 78 with a rocker lug 77 struck up at its end to provide a knife-edge for the forked end 80 (FIG. 6) of a plunger extending into one end of a compression spring 81, from the opposite end of which extends a second plunger having a forked end 82 rockably seating on a pin 83 fixed in the housing, whereby an over-center, snap-action throwing spring means is provided.

The coupling arm 75 is removably engaged with the gear 65 by means of a hub 65H on the latter, undercut to provide an annular groove 65G of smaller diameter than the hub, the hub 78 of the coupling or friction arm having a concentric small hole 85 adapted to interfit with the reduced groove 65G on the gear, and a contiguous larger hole 86 freely fitting over hub 65H so that the smaller hole 85 can be pressed home in the groove, thereby securely joining the arm with the gear while permitting the latter freedom of rotative movement with a strong tendency to drag the coupling arm around with the gear.

The modified construction of FIG. 6 operates substantially in the same manner as the device of FIG. 3 in that starting of the motor shifts the rotor and its drive pinion 62 axially to engage the motor pinion with the driven gear 63, the pinion 63A of which will drive either the forward idler 64 or the reversing set of idlers 69, 70, depending on the position of the carrier 71 at that time.

Thus, in the position of the carrier and its snap-action throw means 80, 81, 82, in FIG. 6, the driven gear 63 and its integral transfer pinion 63A will drive the reverse idling pinion 69; but in the opposite attitude with the motor pinion 62 disposed in the hole 92, FIG. 9, the transfer pinion 63A will engage the forward idler pinion 64.

When the motor starts, the spring throw means begins to become cocked or tensioned as in the first-described embodiment, but the carrier 71 is prevented from rocking by the shifted or elevated motor shaft and pinion by the means apparent in the magnified scale of FIG. 9, and comprising the provision of an undercut annular groove 90 beneath the pinion in the motor shaft at a level with the plane of the carrier plate when the shaft is spring-retracted but which moves out of such alignment when the rotor pulls into the field and the shaft is shifted to project through one of the two overlapped holes 91, 92 therein and forming, by reason of the overlap, a pair of opposite cusps 93 adapted to fit into said annular groove when the shaft is withdrawn and to impinge against the shaft at the base of the pinion as long as the shaft remains advanced (i.e. elevated in FIG. 9) whereby to prevent the carrier from completing its shift under urgence of the throw means until such time as the shaft shall next be withdrawn, as by stoppage of the motor, so that the cusps 93 can clear through the groove 90, the displacement of the carrier being limited in both directions of throw or rocking displacement by lugs 71A and 71B struck up from the carrier plate.

In the form of construction depicted in FIGS. 10 to 13 the stop-start reversing mechanism derives a throwing force for the carrier from a gear-driven cam and spring means requiring less space than an over-center spring means.

Figure 12:
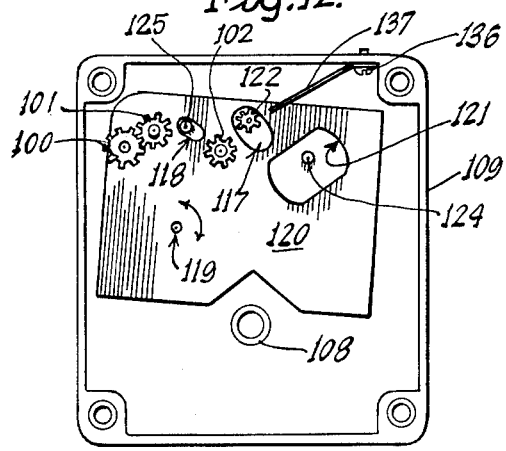
FIG. 12 is a view of the rocking gear carrier plate employed in the embodiments of FIGS. 10 and 11.

In this modification, the carrier plate 120 is of the configuration seen in FIG. 12, with a pair of idler pinions 100, 101 in mesh, and a third single idler pinion 102 spaced from the pair on an arc such that both the pinion 100 and 102 will engage with a large intermediate reduction gear 105 having an integral pinion 105A driving a main output gear 106 journalled on a countershaft 107 receivable in a bearing 108 (FIG. 12) in the gear housing 109, as in the previously described devices, the said gear housing being adapted for attachment to the same kind of motor with magnetically shiftable rotor means, as described in view of FIG. 1, and having a retractable motor pinion 122 axially shiftable through an oversize slot 117 in the carrier.

Fixed in the housing floor is a bearing stud 124 projecting up through a large cam slot 121 in the carrier, and upon which a special cam gear 130 is journalled. The carrier is pivoted to oscillate on a pin 119 set in the housing and the throw of the carrier is limited by another stud pin 125 also fixed in the housing and serving both as a stop for the limits of a slot 118 in the plate, and as a journal for a driven gear 126 having a pinion 126A integral therewith.

Figure 11:
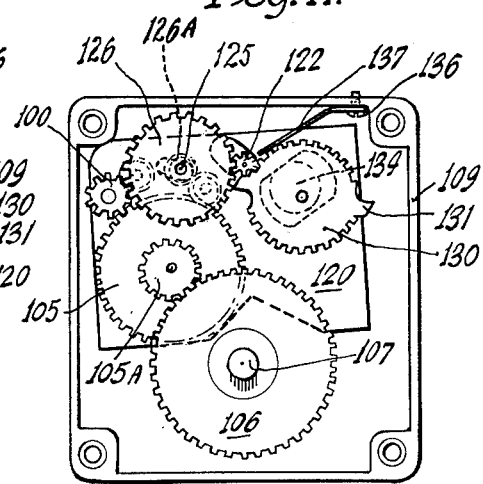
FIG. 11 is a view like FIG. 10, with the parts triggered into reverse drive.
Figure 13:
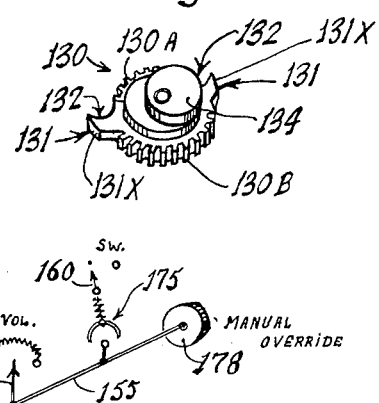
FIG. 13 is a perspective detail of the reversing gear employed in the embodiment of FIGS. 10 to 12.

The special throw-gear means is shown in FIG. 13 to comprise a gear 130 having a pair of diametrically disposed radial stop arms 131 each with an arcuate stop notch 132 near its end and of a size to fit fairly closely against the peripheral arc of the motor pinion 122, as in FIGS. 10 and 11.

On the underside of gear 130 is an eccentric lobe or cam member 134 which works against the margins of the large cam slot 121 in the carrier and is also of a thickness to space the gear 130 high enough from the housing floor to engage with the motor pinion 122 in the projected condition, but not in the retracted condition, of the latter.

Secured to a portion of the housing as at 136 is a blade spring 137 adapted to be engaged and tensioned by the ends of the radial arms 131, as in FIG. 10, at a time when one of these arms has been turned into abutment with the motor pinion; the ends of each of these arms being pitched as at 131X (FIG. 13) sufficiently to throw the arm away from the spring when the pinion 122 retreats, whereby to nudge the stop arm past the pinion from the position of FIG. 10 to that of FIG. 11, so that on the next starting of the motor the next succeeding half of the gear teeth 130A or 130B, into which the gear 130 is divided by the diametrically projecting stop arms 131, can engage with the motor pinion.

The cam 134, moving unidirectionally, and working in cam slot 121, will throw the carrier into alternately opposite positions, thus alternately rocking the driven gear 126 to engage its pinion 126A with one or the other of the reversing pinions 101 or 102.

The cam gear 130 will always travel in one direction, being engaged (along with driven gear 126) by the motor pinion 122, in one or the other of its two half-tracks of gear teeth 130A or 130B, and these teeth being mutilated at their conjunctions with the stop curves 132, so that when the latter zone is reached to stop against the motor pinion, the latter can continue to rotate freely since the half-tracks of gear teeth 130A, 130B end at this point. The tension of the blade spring at this time, and its action on the pitched or slanted ends 131X of the radial stop arms, is biased in a direction to throw the arms always in the same direction (counterclockwise, FIGS. 10, 11) a sufficient distance to carry the arm past the motor pinion and expose the next succeeding section or half-track of gear teeth to this pinion in readiness for the next ensuing operation or starting of the motor.

It will be understood that all embodiments disclosed utilize the motor pinion as a temporary holding stop, while deriving power from the driving action of this pinion on other gear elements to store power capable of throwing the carrier to reverse the gear drive as soon as the motor pinion is displaced into a non-stopping position.

In the embodiments of FIGS. 1 to 9 the pre-tensioning of the spring means is derived through a form of friction or slip-clutch means from one of the rotative members, e.g. a gear, which is also used as a part of a reduction gear train, while in the embodiment of FIG. 10 the carrier-throwing energy is stored in a throw spring by energy derived from a special cam gear with radial means engaging the spring to tension the same and throw the gear undirectionally beyond a stop point in readiness for the next cycle, and at the same time throwing the reverse gear carrier by action thereon of cam means movable with the special gear, the motor pinion acting as in the other embodiment as a stop when in its driving position and as a throw-release trigger when upon retraction.

One of the utilitarian applications of the disclosed reversing mechanism is that of remotely controlling a rotatable member such as a volume control or a switch, or both, for example in a radio or television set. A device for this purpose is shown in FIG. 5 and includes a motor 150 and reverse-action reduction gear means contained in the housing 61, closed by a bracketed mounting plate 151 attached thereto, the reverse-drive means being optionally the type shown in FIG. 6 or FIG. 3, or 10, with the main drive shaft being accordingly 27, 67 or 107.

For manual control the protruding shaft portions will be flatted, as at 67R in FIG. 5, to receive a manual control knob (not shown) so that the remotely controlled motor need not be operated if manual over-ride is desired.

Secured to the motor housing 151 is a bracket or plate 153 on which is mounted a conventional rotary type volume control 154 having an operating shaft 155, which may likewise be flatted or keyed to accept a manual over-ride knob (not shown). The volume control may also have a snap-action on-off switch 160 (FIGS. 5, 14) built into it or attached as a barnacle, and actuated in extreme angular position of the shaft to turn the radio or television set on and off, such controls being well known in the art and not per se part of the invention.

Fast on the controlled shaft 155 is a clutch disc 156 which may be of steel or other metal, and which is tightly grabbed between a pair of friction clutch discs 157 of rubber or other suitable friction material exerting a highly frictional grasp on the metal, and said pair of discs being fast on the motor output shaft 67.

When the motor is started running in a given direction, disc 157 will rotate discs 156 and the volume control shaft 155; but if the direction is not suitable, the motor needs merely to be stopped and started again to reverse the drive.

Thus, if the volume is being increased, it can be decreased merely by starting and stopping the motor once again, and it requires only a simple switch and lead wires to operate the motor from any desired remote position.

Figure 14:
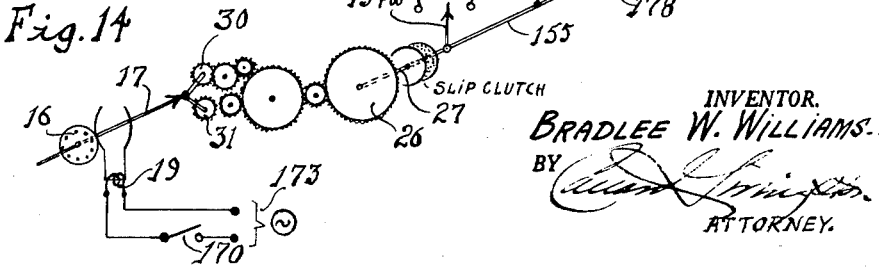
FIG. 14 is a schematic operating diagram of the control device of FIG. 5.

FIG. 14 shows schematically the operation of the application of the reversing mechanism to a controlled device such as the combination volume control and on-off radio or TV switch combination of FIG. 5 wherein the motor winding 19 is connected to power terminals 173 through a start-stop switch 170, and the motor shaft 17 drives a set of rockable reversing gears 30–31 to drive an output gear 26, as in the arrangement described in view of FIG. 1 or 3, which in turn will reversely turn the shaft 27 (or 67 of FIG. 5) dependently upon starting and stopping of the motor by operation of the switch 170.

Turning of the shaft 27 will result in movement of the volume control wiper arm 154W to vary the resistance in the known manner or to actuate the switch means 160, a knob 178 being preferably supplied and made fast on the output shaft 27 (or 67 or 107, whichever embodiment is employed) or directly upon the volume-control shaft 155, so that manual override is available at the radio or TV set, in which the novel motor control unit is to be installed.

The invention is not limited to the forms of construction shown nor to the particular utilitarian applications described except as may be specifically provided in the claim of invention appended.

I claim:

1. An automatic reversing mechanism comprising a gear system including output gear means and a driving pinion and means for rotating the same in a certain direction; reverse gear means including first and second reversing gears mounted on a carrier movable into opposite control positions to engage one or the other of the same in driving engagement with the said driving pinion; means for shifting the driving pinion axially into and out of a driving position in relation to said first and second reverse gears for driving engagement with one or the other thereof, depending upon the position of said carrier; carrier-moving means including means cooperable with a gear in said system for deriving power therefrom to throw the carrier into one or the other of said opposite positions thereof alternately in a direction to engage the same with said driving pinion when the latter is in said driving position, such driving engagement of the driving pinion and a reverse gear blocking completion of the carrier movement toward that one of said opposite positions toward which it has started to move; and means coacting with said carrier-moving means exerting a constant force on the carrier in a direction to cause the same to complete started movement toward one or the other of said opposite positions on withdrawal of the driving pinion by axial shift as aforesaid a predetermined distance, whereby on the next ensuing axial shift of the driving pinion into driving position it will drivingly engage the alternate one of the reverse gear means from that engaged in the last preceding driving action thereof.

2. Mechanism as set forth in claim 1 further characterized in that said carrier-moving means comprises a friction clutch device yieldingly engaging a gear in said system to derive torque therefrom, and an over-center spring means moved by said device in opposite directions on each reversal of direction of the output gear means to actuate the same in carrier-moving operation and to complete the carrier movement on withdrawal of the driving pinion as aforesaid.

3. Mechanism as set forth in claim 1 in which said carrier moving means comprises a throw gear driven by said driving pinion in driving position relative to said reverse gear means; a throw spring tensioned by rotative action of said throw gear; stop means on the throw gear engageable with said driving pinion to block rotative movement of the throw gear after a predetermined amount of rotation thereof in tensioning said throw spring; withdrawal of the driving pinion from driving position freeing the throw gear for throw movement by the throw spring; and means moved by the throw gear and acting in alternation on each pinion-freed throw movement of the throw gear to move the carrier into an opposite position from that occupied in the last-preceding throw position, whereby to rock one or the other of said reverse gears into driving engagement with a gear in said system to alternately reverse the direction of the output gear responsive to each movement of the driving pinion into said driving position.

4. Mechanism as set forth in claim 1 further characterized in that means for axially shifting the driving pinion is an electromagnetic device having shaft means for rotating the pinion and movable axially back and forth to dispose the driving pinion in or out of said driving postion.

5. Mechanism as set forth in claim 4 further characterized in that said electromagnetic device is an electric induction motor having a rotor on said axially-shiftable shaft normally spring-urged substantially out of the motor field when the motor is deenergized, and attracted into said field when the motor is energized, whereby to move the driving pinion into and out of driving position as aforesaid.

6. The combination with an electric motor having a rotor normally spring-urged substantially out of the magnetic driving field into a non-driving position when the field is substantially deenergized and attracted into said field into a driving position when the field is energized, of reverse drive mechanism acting on each movement of the rotor into and out of driving position to reverse the drive of said mechanism, the latter comprising, namely: a motor drive pinion moved by said shaft correspondingly into and out of a driving position; a carrier rockable back and forth between opposite reverse position; reverse gear means on the carrier having first and second conditions of driving engagement with the motor pinion when the latter is in driving position; further gear means driven reversely by said reverse gear means depending on which of the first or second conditions thereof prevails; means cooperable with said further gear means for deriving power therefrom and applying same to the carrier to rock the same back and forth alternately from one of said reverse positions toward the other thereof responsive to each driving operation of the motor pinion producing driving torque in said further gear means; said motor pinion acting in its driving position to prevent full movement of the carrier into either of said reverse positions thereof, the motor pinion when axially shifted a predetermined distance out of driving position permitting the carrier to complete movement into that one of the reverse driving positions toward which it has started to move and which it is prevented from reaching by the motor pinion, as aforesaid, whereby in consequence of each movement of the motor pinion to and from driving position as aforesaid, the carrier will be rocked to the opposite position from that occupied in the last preceding driving position of the motor pinion to change the direction of drive of said further gear means automatically as a function of each energization of said motor field.

7. In a reverse drive mechanism, in combination, a driven gear means, a driving pinion shiftable axially to and from predetermined driving and non-driving positions in a direction in parallelism with the rotative axes of said gear means; reverse gear means rotative in axial parallelism relative to said driven gear means and said pinion and shiftable into reverse driving positions cooperatively with said gear means to reverse the driving direction thereof depending upon which of said reverse driving positions is occupied; and means actuated by the driving pinion as a function of each complete axial shift thereof to and from said driving and non-driving positions to effect shifting of said reverse gear means from one to another of said reverse driving positions.

8. A reverse driven mechanism comprising a driven gear means, a driving pinion carried on a shaft shiftable axially to and from driving and non-driving positions into and out of cooperative relation with said driven gear means, reverse gear means mounted on a common carrier means shiftable back and forth to dispose said reverse gear means in alternate reverse-driven control positions in operative relation with said driven gear means to reverse the driving direction of the latter; and means actuated as a function of substantially concurrent rotative driving action and axial shifting of the driving pinion to effect movement of said carrier means in alternation from one of said reverse-drive positions to another thereof each time said pinion shifts out of cooperative relation with the driven gear means.

9. A motor with automatic, start-stop reverse drive means comprising driven gear means and reverse drive gear means cooperable therewith and shiftable into reverse-driving positions in functional relation thereto to reverse the driving direction thereof depending upon which of said reverse-driving positions obtains; a drive pinion cooperable with said reverse gear means and rotatable to supply driving force to said gear means in a direction determined by said reverse gear means, said drive pinion also being shiftable axially to and from driving and non-driving positions of intermesh with said reverse gear means; an electromotor driving said drive pinion and operable to impart both axial and rotative movement thereto as a function of each cycle of energization and de-energization thereof; and means actuated as a resultant function of both said rotative and axial shifting movements of the drive pinion in movement thereof to and from driving and non-driving positions in each said cycle to move said carrier from one of said reverse-drive positions to the other.

10. In a reversing gear system, the combination, with an axially shiftable drive pinion of a driven output gear, and intermediate reverse gear means mounted to rotate about axes adjacent and parrallelling the axial shift axis of the pinion and also to move laterally into reversing position toward and away from the pinion axis respectively into and out of driving engagement with the pinion when the latter is axially shifted into a predetermined driving position in juxtaposition thereto; together with means for axially shifting said pinion, and means for deriving power from movement of the pinion for moving the reverse gear means into said reversing position as a function of each complete axial reciprocation of the pinion to and from said predetermined position.

11. In a reverse drive motor mechanism of the type including an induction motor having an inductively shiftable rotor and shaft with drive pinion adapted to engage and disengage driven gear means responsive to starting and stopping of the motor, improvements including an automatic reversing mechanism comprising: a carrier including first and second driven gears disposed in driving juxtaposition to said drive pinion, said carrier being rockable about an axis such that opposite rocking movements of the carrier will cause one or the other of said driven gears to engage said drive pinion; a main output gear and means mounting the same adjacent said carrier, further gear means including an intermediate gear drivingly associated with said output gear and said first and second driven gears to be reversely driven by the latter depending upon which of said driven gears is operatively engaged with said motor pinion; and a snap-action spring means operatively associated with said intermediate gear means and actuated by the latter responsive to each starting operation of the motor producing turning of the intermediate gear to set the snap-action means for snap action in alternately opposite directions to shift the carrier on stoppage of the motor and disengagement of the motor pinion with a particular one of said driven gears, whereby the other said driven gear will be drivingly engaged with the motor pinion on the next starting operation of the motor and turning of the intermediate gear, repetitiously in alternation as aforesaid, whereby on each complete starting and stopping cycle of the motor the driving direction thereof will be automatically reversed from the direction of the immediately preceding cycle.

12. In combination with a motor, a drive shaft driven by said motor, and a gear system driven from said drive shaft: a set of reversing gears drivingly interposed in said gear system and means mounting the same for oscillatory shifting action angularly into relatively reverse driving relationships with certain gear means therein to change the driving direction of the system; and means operatively associated with said set of reversing gears and actuated by power supplied from said shaft for effecting shifting action thereof alternately back and forth from and to said relationships dependently upon starting and stopping operations of the motor and both the axial and rotary movements of said drive shaft resultant therefrom.

13. Control means comprising in combination: an electric motor having an energizing winding and a drive shaft; gear means driven from said shaft; a set of shiftable reversing gears cooperable with said gear means and shiftable to reverse the driving direction thereof; reversing mechanism operable to shift said set of reversing gears, and means acting responsive to starting and stopping movements of said drive shaft depending upon starting and stopping energization and cessation of energization of said winding for operating said reversing mechanism, whereby the direction of drive of said gear means is reversed responsive to starting and stopping of the motor; a controlled device including an operating member movable back and forth; and means providing a yieldable driving coupling between said gear means and said operating member of the control device for oppositely moving the same as a result of starting and stopping the motor as aforesaid.

14. An automatic reversing gear system comprising, in combination, a driven pinion means and output gear means to be driven thereby; reverse gear means drivingly related to said output gear means and means mounting the reverse gear means for movement into one or the other of two alternate positions of driving relationship to said drive pinion means for causing reverse driving of the output gear means; a driving shaft for said drive pinion means said shaft being shiftable axially to and from a driving position relative to said reverse gear means and in a relationship with the latter to prevent movement of the same from one to the other of either of said alternate driving positions when shifted into driving position; means for deriving power from said gear system when driven by said drive pinion means and applying same to said reverse gear means in either of the alternate driving conditions thereof and providing a force to urge the same into the other said alternate position and to effect movement thereof into said last-mentioned alternate position on shifting of the driving shaft in a direction to withdraw the drive pinion means from said driving position at least a minimal distance to a non-driving position, whereby the output gear means automatically reverses direction under said force each time said drive pinion means moves to and then from said driving position.

References Cited by the Examiner
UNITED STATES PATENTS

| | | | |
|---|---|---|---|
| 1,808,348 | 6/31 | Gatzsche | 74—100 |
| 2,886,974 | 5/59 | Bauer | 74—100 |
| 2,978,923 | 4/61 | Carlson | 74—354 X |
| 3,040,599 | 6/62 | Carlson | 74—354 X |

DON A. WAITE, *Primary Examiner.*

BROUGHTON G. DURHAM, *Examiner.*